US006410082B1

(12) United States Patent
Pinell et al.

(10) Patent No.: US 6,410,082 B1
(45) Date of Patent: Jun. 25, 2002

(54) PROCESS FOR THE FORMATION OF A HEAT-TRANSFERABLE SECURITY STAMP ENTIRELY FREE OF NON-AQUEOUS SOLVENTS

(75) Inventors: William F. Pinell, Lebanon; Rajendra Mehta, Centerville; Harry A. Seifert, Kettering, all of OH (US); John M. Harden, Oxford, NC (US)

(73) Assignee: The Standard Register Company, Dayton, OH (US)

( * ) Notice: Subject to any disclaimer, the term of this patent is extended or adjusted under 35 U.S.C. 154(b) by 0 days.

(21) Appl. No.: 09/482,672

(22) Filed: Jan. 13, 2000

Related U.S. Application Data

(63) Continuation-in-part of application No. 09/374,923, filed on Aug. 16, 1999, now abandoned.

(51) Int. Cl.$^{7}$ .......................... B41M 3/12; B41M 3/14; B44C 1/17; B44C 1/24; B32B 7/00

(52) U.S. Cl. ...................... 427/146; 427/147; 427/148; 156/230; 156/238; 156/239; 156/240; 156/247; 156/277; 156/289; 428/195; 428/200; 428/202; 428/914; 428/915

(58) Field of Search ................................ 156/230, 233, 156/237, 238, 239, 240, 241, 242, 247, 277, 289; 427/146, 147, 148; 428/195, 200, 201, 202, 203, 204, 207, 914, 915

(56) References Cited

U.S. PATENT DOCUMENTS

| | | | | |
|---|---|---|---|---|
| 2,746,877 A | * | 5/1956 | Matthes | 428/200 |
| 3,928,710 A | | 12/1975 | Arnold et al. | |
| 4,171,398 A | * | 10/1979 | Hunt | 428/195 |
| 4,687,680 A | | 8/1987 | Narui et al. | |
| 5,104,719 A | | 4/1992 | Kamen et al. | |
| 5,413,815 A | | 5/1995 | Williams et al. | |
| 5,427,997 A | | 6/1995 | Oshima et al. | |
| 5,438,928 A | * | 8/1995 | Chatwin et al. | 101/369 |
| 5,750,630 A | | 5/1998 | Senqupta | |
| 5,766,731 A | | 6/1998 | Stein et al. | |
| 6,228,486 B1 | * | 5/2001 | Kittel et al. | 428/354 |

* cited by examiner

*Primary Examiner*—Richard Crispino
*Assistant Examiner*—Jerry A. Lorengo
(74) *Attorney, Agent, or Firm*—Killworth, Gottman, Hagan & Schaeff, LLP

(57) ABSTRACT

A heat-transferable security stamp is provided including a carrier sheet, a top coat layer, at least one design layer between the carrier sheet and the top coat layer, a release layer between the carrier sheet and the design layer, and a base coat layer between the release layer and the design layer. The release layer includes a water-borne release component. The base coat layer includes a water-borne base coat component. The design layer includes a water-borne design component. The top coat layer includes a water-borne top coat component. The carrier sheet is resistant to heat above a predetermined heat transfer temperature. The adhesive release component of the release layer is operative to secure the carrier sheet to the base coat layer at temperatures below the heat transfer temperature and to permit release of the carrier sheet from the base coat layer at temperatures above the heat transfer temperature. The base coat component of the base coat layer is operative to function as a barrier between the release layer and the design layer at temperatures above and below the heat transfer temperature. The design component of the design layer is operative to provide an indication of the presence of the security stamp. The top coat component is operative to adhere to a substrate upon contact with the substrate and upon application of heat above the heat transfer temperature. The recited water-borne components may be capable of being borne in water as an aqueous emulsion, an aqueous dispersion, or an aqueous solution.

31 Claims, 2 Drawing Sheets

PROCESS FOR THE FORMATION OF A HEAT-TRANSFERABLE SECURITY STAMP ENTIRELY FREE OF NON-AQUEOUS SOLVENTS

CROSS REFERENCE TO RELATED APPLICATION

This application is a continuation-in-part of applicants' earlier filed application Ser. No. 09/374,923, filed Aug. 16, 1999 now abandoned.

BACKGROUND OF THE INVENTION

The present invention relates to heat-transferable security stamps and processes for forming the same. More particularly, the present invention relates to unitary and multi-layered heat-transferable security stamps where the components of each layer within the security stamp are selected according to predefined processing goals.

Security stamps are commonly transferred from a paper or film carrier sheet to another surface under the application of heat. One common application example involves the transfer of a tax stamp to a carton or pack of cigarettes to indicate payment of applicable taxes on the product. U.S. Pat. No. 2,746,877 teaches a multi-layered dry release transfer stamp. Each of the layers utilizes specially selected solvent-based inks or coatings to enable the transfer of a visually perceptible security stamp to an associated target substrate. Other conventional transfer stamps also utilize non-aqueous solvents because they are widely available and were originally economical. However, safety concerns related to the use, storage, recovery, and disposal of non-aqueous or alcohol-based solvents have given rise to a number of OSHA regulations requiring the installation of specialized peripheral equipment for handling potentially dangerous solvents. The installation and maintenance of such peripheral equipment has driven up the cost of utilizing traditional solvents in the manufacture of transfer stamps. Further, in many instances the cost of disposing a solvent used in a particular manufacturing process has become higher than the original cost of obtaining the solvent.

There are a limited number of alternatives to the traditional solvent-based production processes. Accordingly, it is currently not possible to address the above-noted negative manufacturing issues related to the use of solvents in the production of heat transfer stamps. As a result, there continues to be a need for an economical and versatile transferable security stamp that does not necessitate the use of solvent based layers for production.

BRIEF SUMMARY OF THE INVENTION

This need is met by the present invention wherein a heat-transferable security stamp and an associated manufacturing scheme are provided wherein water-borne structural components are utilized and arranged to enable more cost-effective, efficient, and safe transfer stamp production while maintaining optimal transfer stamp functionality.

In accordance with one embodiment of the present invention, a process is provided for forming a unitary heat-transferable security stamp comprising a carrier sheet, a top coat layer, at least one design layer between the carrier sheet and the top coat layer, a release layer between the carrier sheet and the design layer, and a base coat layer between the release layer and the design layer. The process comprises the steps of: (i) providing the carrier sheet; (ii) forming the release layer by presenting a water-borne adhesive release component (iii) forming the base coat layer by presenting a water-borne base coat component; (iv) forming the design layer by presenting a water-borne design component; and (v) forming the top coat layer by presenting a water-borne top coat component. The carrier sheet is selected such that it is resistant to heat above a predetermined heat transfer temperature. The adhesive release component of the release layer is selected such that it is operative to secure the carrier sheet to the base coat layer at temperatures below the heat transfer temperature and to permit release of the carrier sheet from the base coat layer at temperatures above the heat transfer temperature. The base coat component of the base coat layer is selected such that it is operative to function as a barrier between the release layer and the design layer at temperatures above and below the heat transfer temperature. The design component of the design layer is selected such that it is operative to provide an indication of the presence of the security stamp. The top coat component is selected such that it is operative to adhere to a substrate upon contact with the substrate and upon application of heat at the heat transfer temperature.

The release layer, the base coat layer, the design layer, and the top coat layer are preferably further formed by a series of drying steps, wherein respective drying steps are executed following presentation of a selected one of the layers and prior to presentation of a subsequent one of the layers. The drying step may be characterized by microwave irradiation, infrared irradiation, heated forced air drying, etc.

The carrier sheet preferably comprises a non-siliconized liner. Preferably, the release layer is applied to a major surface of the carrier sheet, the base coat layer is applied to the release layer, the design layer is applied to the base coat layer, and the top coat layer is applied to the design layer. The water-borne components may be presented as aqueous emulsions, aqueous dispersions, or aqueous solutions.

The release layer may be formed as a continuous film and may be presented as a blend of polyethylene and an aqueous paraffin wax emulsion having a melting point that is less than the heat transfer temperature.

The base coat layer may also be formed as a continuous film and may be presented as a polymeric emulsion including the base coat component. The base coat component is preferably presented so as to form a cross linked polymeric layer having a melting point that exceeds the heat transfer temperature.

The design layer is formed by presenting a polymeric emulsion including the design component and is formed in a visually perceptible pattern in the security stamp. The melting point of the design component also exceeds the heat transfer temperature. Preferably, a plurality of design layers are provided and each design layer includes a distinct design component.

The top coat layer is formed by presenting a polymeric emulsion including the top coat component and is selected such that the heat transfer temperature is at least as great as a characteristic softening temperature of the top coat.

An additional design layer may be formed in a predetermined pattern on the top coat layer. The additional design layer may be formed after formation of the remaining layers of the stamp. The additional design layer may be formed of UV fluorescent ink via an ink jet printing process and may comprise a number selected from a series of consecutive numbers.

In accordance with another embodiment of the present invention, a unitary heat-transferable security stamp is provided comprising a carrier sheet, a top coat layer, at least one design layer between the carrier sheet and the top coat layer, a release layer between the carrier sheet and the design layer, and a base coat layer between the release layer and the design layer. The security stamp is formed by a process comprising the steps of: (i) providing the carrier sheet; (ii) forming the release layer by presenting a water-borne adhesive release component; (iii) forming the base coat layer by presenting a water-borne base coat component; (iv) forming the design layer by presenting a water-borne design component; and (v) forming the top coat layer by presenting a water-borne top coat component. The carrier sheet is selected such that it is resistant to heat above a predetermined heat transfer temperature. The adhesive release component of the release layer is selected such that it is operative to secure the carrier sheet to the base coat layer at temperatures below the heat transfer temperature and to permit release of the carrier sheet from the base coat layer at temperatures above the heat transfer temperature. The base coat component of the base coat layer is selected such that it is operative to function as a barrier between the release layer and the design layer at temperatures above and below the heat transfer temperature. The design component of the design layer is selected such that it is operative to provide an indication of the presence of the security stamp. The top coat component is selected such that it is operative to adhere to a substrate upon contact with the substrate and upon application of heat at the heat transfer temperature.

In accordance with yet another embodiment of the present invention, a heat-transferable security stamp is provided comprising a carrier sheet, a top coat layer, at least one design layer between the carrier sheet and the top coat layer, a release layer between the carrier sheet and the design layer, and a base coat layer between the release layer and the design layer. The release layer includes a water-borne release component. The base coat layer includes a water-borne base coat component. The design layer includes a water-borne design component. The top coat layer includes a water-borne top coat component. The carrier sheet is resistant to heat above a predetermined heat transfer temperature. The adhesive release component of the release layer is operative to secure the carrier sheet to the base coat layer at temperatures below the heat transfer temperature and to permit release of the carrier sheet from the base coat layer at temperatures above the heat transfer temperature. The base coat component of the base coat layer is operative to function as a barrier between the release layer and the design layer at temperatures above and below the heat transfer temperature. The design component of the design layer is operative to provide an indication of the presence of the security stamp. The top coat component is operative to adhere to a substrate upon contact with the substrate and upon application of heat above the heat transfer temperature. The recited water-borne components may be capable of being dispersed in water as an aqueous emulsion, an aqueous dispersion, or as an aqueous solution.

Accordingly, it is an object of the present invention to provide an alternative transfer stamp and transfer stamp production technique that are economical, versatile, and safe. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
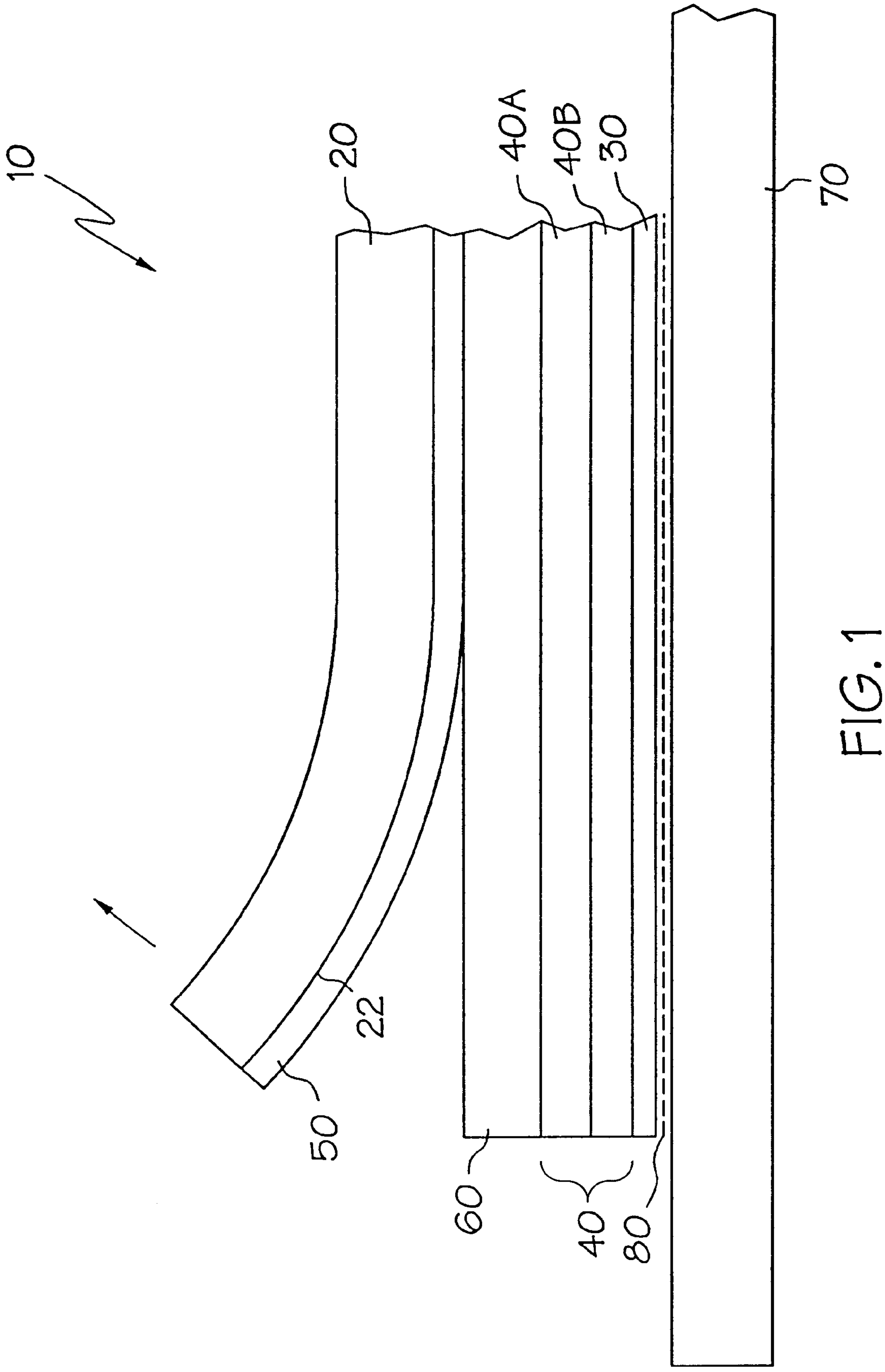
FIG. 1 is a schematic illustration, in cross section, of a heat-transferable security stamp according to the present invention.
Figure 2:
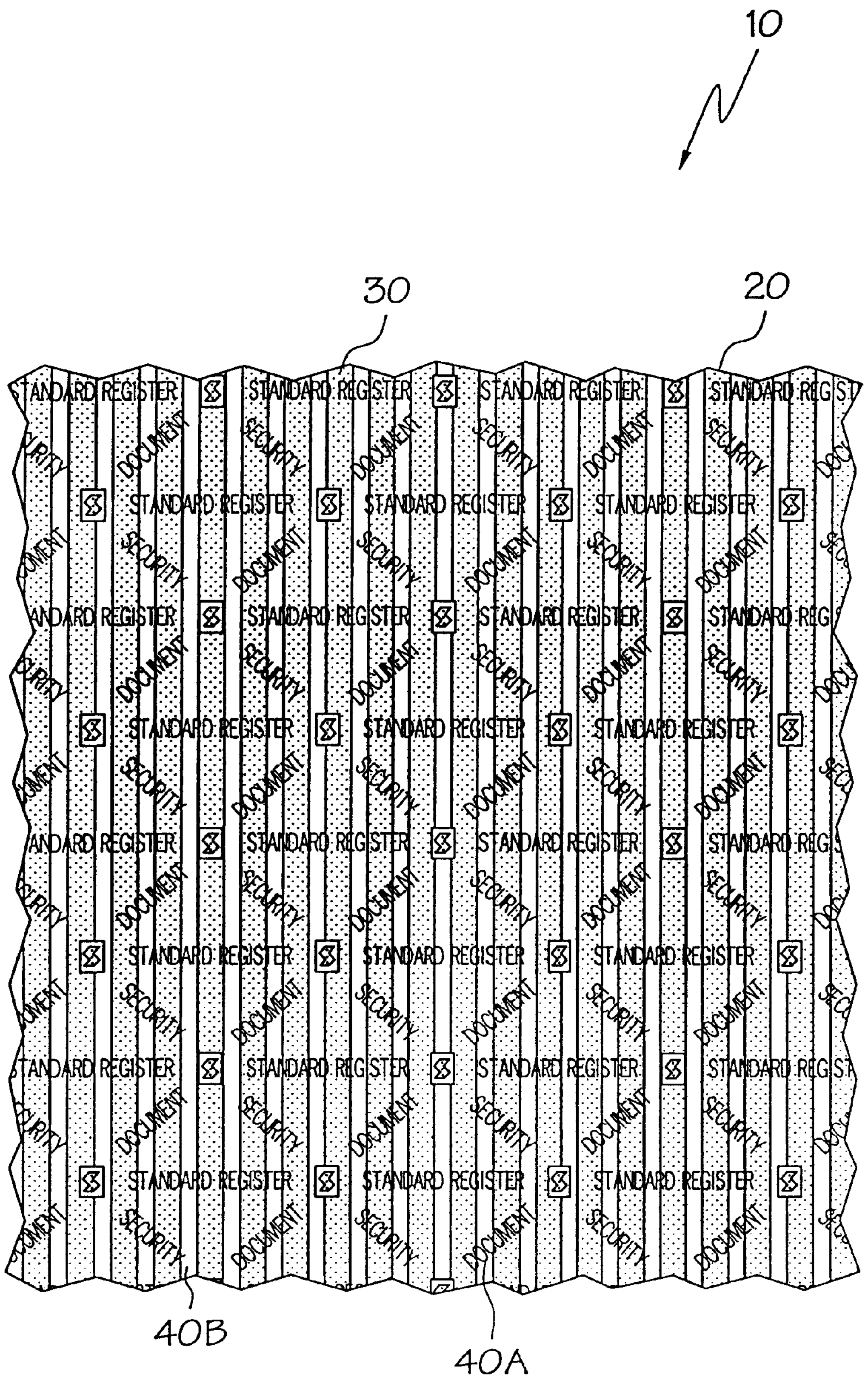
FIG. 2 is an illustration of a facial design arrangement of a heat-transferable security stamp according to the present invention.

Referring now to FIGS. 1 and 2, a unitary heat-transferable security stamp 10 and a process for its formation are illustrated in detail. The stamp 10 comprises a carrier sheet 20, a top coat layer 30, one or more design layers 40 between the carrier sheet 20 and the top coat layer 30, a release layer 50 between the carrier sheet and the design layers 40, a base coat layer 60 between the release layer 50 and the design layers 40, and an additional design layer 80 formed on the top coat layer 30. For the purposes of describing and defining the present invention, it is noted that a unitary stamp is a stamp including individual components or layers that are physically coupled together as a single object.

The stamp 10 is formed by first providing the carrier sheet 20 and forming the release layer 50 thereon. The carrier sheet 20 typically comprises 2.1 mil non-siliconized densified bleached kraft paper liner. The release layer 50 is presented as a water-borne adhesive release component and is applied to a major surface 22 of the carrier sheet 20 as a continuous film. For the purposes of describing and defining the present invention, it is noted that a water-borne component may comprise a component dispersed in water, emulsified in water, or otherwise dissolved in or mixed with water. For example, the water-borne adhesive release component of the release layer 50 may be presented as an aqueous dispersion or an aqueous emulsion. For the purposes of describing and defining the present invention, it is noted that a dispersion is a distribution of finely divided particles in a medium. An emulsion is a stable dispersion of one liquid in a second immiscible liquid. A solution is a homogenous mixture in which particular components of the mixture are uniformly distributed on a molecular scale.

According to a specific embodiment of the present invention, the adhesive release layer 50 is formed by presenting a dispersion or emulsion of paraffin wax, polyethylene, high density, polyethylene, polypropylene, vegetable waxes, or a blend of polyethylene and a paraffin wax. The blend is applied to the carrier sheet 20 at the rate of about 8 g/$m^2$ on a dry basis, i.e., not including the water in which it is dispersed.

The carrier sheet 20 is selected such that it is resistant to heat above a predetermined heat transfer temperature. In contrast, the adhesive release component of the release layer 50 is selected such that it is operative to secure the carrier sheet 20 to the base coat layer 60 at temperatures below the heat transfer temperature and to permit release of the carrier sheet 20 from the base coat layer 60 at temperatures above the heat transfer temperature. For example, where the heat transfer temperature is maintained at about 160° C. (320° F.) for about 0.33 seconds, the paraffin wax is selected such that it has a melting point of about 55° C. (130° F.).

As the release layer 50 reaches its melting point, the bond formed by the release layer 50 between the carrier sheet 20 and the base coat layer 60 is degraded and the carrier sheet 20 may be readily separated from the remainder of the stamp 10. As will be described in detail below, application of transfer heat also enables formation of an adhesive bond between a substrate 70 and the top coat layer 30. Thus, upon application of suitable heat, the stamp 10 may be bonded to the substrate and the carrier sheet 20 may be removed therefrom, effectively transferring the remaining components of the stamp 10 from the carrier sheet 20 to the substrate 70.

The base coat layer 60 is presented as a water-borne base coat component and is applied to the release layer 50 as a continuous film. The base coat component is either presented as an aqueous emulsion, an aqueous dispersion, or an aqueous solution and preferably forms a cross-linked polymeric layer within the structure of the stamp 10. According to a specific embodiment of the present invention, the base coat layer 60 is formed by presenting a water-borne modified acrylic material. For example, a suitable base coat may be presented by utilizing an aqueous blend of styrenated-acrylic emulsions and resin solutions, such as that manufactured by Kustom Services, Inc. of Florence, Ky. under the product identifier KF-5013. More specifically, according to one embodiment of the present invention, the composition forming the base coat component contains about 85–90% of a styrenated acrylic emulsion polymer exhibiting a glass transition temperature of about 120–130° C. Additional components of the composition may include defoamers, surfactants, and other performance additives.

To ensure stamp integrity, the base coat component is selected such that it has a melting point that exceeds the heat transfer temperature of the particular application. For example, in one embodiment of the present invention, the base coat component is selected to have a melting point of greater than 190° C. (380° F.) and is applied at a rate of 4 $g/m^2$ on a dry basis. Further, the base coat component of the base coat layer 60 is selected such that it is operative to function as a barrier between the release layer 50 and the design layers 40 at temperatures above and below the heat transfer temperature. In this manner, adverse reaction or mixing of the design layers 40 with the release layer 50 is avoided.

The design layers 40 are presented as respective water-borne design components and are applied to the base coat layer 60 in distinctive arrangements or patterns. Specifically, in the illustrated embodiment, a first design layer 40A is printed in a diagonal pattern over about 10% of the major surface 22 of the carrier sheet 20 and also forms a selected logo in the diagonal pattern. According to a specific embodiment of the present invention, the first design layer 40A is formed by presenting a film-forming acrylic polymer dissolved in a solution of water and 2% blue dye. The polymer is selected such that its softening point is about 65° C. (150° F.) and its melting point is about 100° C. (220° F.) to ensure stamp integrity and pliability at the heat transfer temperature. A suitable design layer 40A may be printed by utilizing an aqueous blend of styrenated-acrylic emulsions and resin solutions manufactured by Kustom Services, Inc. of Florence, Ky. under the product identifier KF-5008. More specifically, the design layer 40A may be presented as a composition containing about 55–60% of a styrenated acrylic emulsion polymer exhibiting a glass transition temperature of about 20–25° C. In addition the composition also contains about 10–14% of a modifying rosin-based resin exhibiting a softening point of about 120–140° C. Additional components of the composition may include defoamers, surfactants, and other performance additives.

A second design layer 40B is printed as a series of white stripes. According to a specific embodiment of the present invention, the second design layer 40B is formed by presenting a film-forming acrylic polymer containing a white pigment. The polymer is selected such that its softening point is about 80° C. (180° F.) and the melting point is about 115° C. (240° F.) to ensure stamp integrity and pliability at the heat transfer temperature. A suitable design layer 40B may be printed by utilizing the above-noted KF-5008 product or a pigmented flexo ink available from Water Ink Technologies of Lincolnton, N.C. under the product identifier WLL000904.

It is contemplated by the present invention that the number and arrangement of the particular design components disclosed herein are merely illustrative examples of specific embodiments of the present invention. A variety of additional distinct design components may be utilized in the present invention to indicate the presence of the stamp 10 on a substrate. For example, the design layers 40 may be formed with a variety of different pigments, in a variety of different visually perceptible patterns, or to incorporate fluorescent, thermo-chromic, photo-chromic, or other security features. It is further contemplated by the present invention that a variety of materials may be utilized to form the design component of the present invention.

The top coat layer 30 is presented as a water-borne top coat component and is applied to the second design layer 40B over the area of the stamp as a continuous film. The top coat component is either presented as an aqueous emulsion, an aqueous dispersion, or an aqueous solution. According to a specific embodiment of the present invention, the top coat layer 30 is formed by presenting a blend of water-borne film-forming acrylic polymers and applying the polymer to the second design layer 40B at the rate of about 3 $g/m^2$ on a dry basis. The polymer is selected such that its softening point is preferably about 55° C. (130° F.), becoming tacky at about 75° C. (167° F.), and having a melting point of about 150° C. (300° F.). The top coat component is selected so as to enable formation of an adhesive bond between the top coat layer 30 and a variety of substrate materials upon application of a transfer heat above the softening point of the top coat component. Thus, the stamp 10 may be bonded to a substrate and the carrier sheet 20 may be removed therefrom, effectively transferring the remaining components of the stamp 10 from the carrier sheet 20 to the substrate 70. A suitable top coat layer 30 may be printed by utilizing a tackifying resin and an aqueous blend of solutions manufactured by Kustom Services, Inc. of Florence, Ky. under the product identifiers KF-5004 and KF-5008. More specifically, the top coat layer 30 may be presented as a composition containing about 60–65% of a styrenated acrylic emulsion polymer exhibiting a glass transition temperature of about −15° C. In addition, the composition also contains about 8–10% of a modifying resin exhibiting a melting point range of about 160–170° C. Additional components of the composition may include defoamers, surfactants, and other performance additives.

The top coat layer 30, the design layers 40, the release layer 50, and the base coat layer 60 may each be printed on the respective underlying layer or carrier sheet through any one of a variety of printing techniques, including flexographic, gravure, dry offset lithography, or wet offset lithography. Preferably, each layer is at least partially dried prior to application of a subsequent layer. Each layer may be dried with heated air or through microwave irradiation. Drying through microwave irradiation is a preferred drying step for the water-borne polymers disclosed herein because it presents a means for quickly and precisely drying the water-borne layers applied according to the present invention. Further, microwave drying is advantageous because it provides a means by which water may be removed from a given layer without substantially increasing the temperature of an underlying layer. One or more of the above-described layers may have incorporated into it, one or more security pigments or dyes exhibiting fluorescent, thermo-chromic, or photo-chromic characteristics, which may be detected according to conventional means.

The additional design layer 80 is formed in a predetermined pattern on the top coat layer 30 after all the other structural layers of the stamp 10 have been printed. It is important to note that the pattern or graphic design defined by the additional design layer 80 should be selected so as not to significantly interfere with the above-noted adhesive bond created between the top coat layer 30 and the substrate 70 to which the stamp 10 is secured.

The additional design layer 80 may be formed on the top coat layer 30 via an ink jet printing process and may comprise a security pattern or number printed in UV flourescent ink. In one embodiment of the present invention the additional design layer 80 comprises a number selected from a series of consecutive numbers.

Accordingly, by the present invention, a heat-transferable security stamp is provided comprising a carrier sheet 20, a top coat layer 30, at least one design layer 40 between the carrier sheet 20 and the top coat layer 30, a release layer 50 between the carrier sheet 20 and the design layer 40, and a base coat layer 60 between the release layer 50 and the design layer 40. The release layer 50 includes a water-borne release component. The base coat layer 60 includes a water-borne base coat component. The design layer 40 includes a water-borne design component. The top coat layer 30 includes a water-borne top coat component. For the purposes of defining and describing the present invention, it is noted that water-borne components are components that are capable of being dispersed in water as aqueous emulsion, an aqueous dispersion, or an aqueous solution.

The carrier sheet 20 is resistant to heat above a predetermined heat transfer temperature and the adhesive release component of the release layer 50 is operative to secure the carrier sheet 20 to the base coat layer 60 at temperatures below the heat transfer temperature and to permit release of the carrier sheet 20 from the base coat layer 60 at temperatures above the heat transfer temperature. The top coat component of the top coat layer 30 is operative to adhere to a substrate 70 upon contact with the substrate 70 and upon application of heat above the heat transfer temperature.

Having described the invention in detail and by reference to preferred embodiments thereof, it will be apparent that modifications and variations are possible without departing from the scope of the invention defined in the appended claims.

What is claimed is:

1. A process for forming a unitary heat-transferable security stamp comprising a carrier sheet, a top coat layer, at least one design layer between said carrier sheet and said top coat layer, a release layer between said carrier sheet and said design layer, and a base coat layer between said release layer and said design layer, wherein said process comprises the steps of:

providing said carrier sheet;

forming said release layer by presenting a water-borne adhesive release component;

forming said base coat layer by presenting a water-borne base coat component;

forming said design layer by presenting a water-borne design component; and forming said top coat layer by presenting a water-borne top coat component, wherein said carrier sheet is selected such that it is resistant to heat above a predetermined heat transfer temperature, said adhesive release component of said release layer is selected such that it is operative to secure said carrier sheet to said base coat layer at temperatures below said heat transfer temperature and to permit release of said carrier sheet from said base coat layer at temperatures above said heat transfer temperature, said base coat component of said base coat layer is selected such that it is operative to function as a barrier between said release layer and said design layer at temperatures above and below said heat transfer temperature, said design component of said design layer is selected such that it is operative to provide an indication of the presence of said security stamp, said top coat component is selected such that it is operative to adhere to a substrate upon contact with said substrate and upon application of heat at said heat transfer temperature, and said release layer, said base coat layer, said design layer, and said top coat layer are further formed by at least one drying step characterized by microwave irradiation.

2. A process for forming a unitary heat-transferable security stamp, said stamp being defined in its entirety by a carrier sheet and a plurality of components, said components including a top coat layer, at least one design layer between said carrier sheet and said top coat layer, a release layer between said carrier sheet and said design layer, and a base coat layer between said release layer and said design layer, wherein said process comprises the steps of providing said carrier sheet; and forming said release layer, said base coat layer, said design layer, and said top coat layer, wherein said plurality of components defining the entirety of said stamp with said carrier sheet are presented as water-borne components, including a water-borne adhesive release component, a water-borne base coat component, a water-borne design component, and a water-borne top coat component such that said process for forming said unitary heat-transferable security stamp is entirely free of non-aqueous solvents, said carrier sheet is selected such that it is resistant to heat above a predetermined heat transfer temperature, said adhesive release component of said release layer is selected such that it is operative to secure said carrier sheet to said base coat layer at temperatures below said beat transfer temperature and to permit release of said carrier sheet from said base coat layer at temperatures above said heat transfer temperature, said base coat component of said base coat layer is selected such that it is operative to function as a barrier between said release layer and said design layer at temperatures above and below said heat transfer temperature, said design component of said design layer is selected such that it is operative to provide al indication of the presence of said security stamp, and said top coat component is selected such that it is operative to adhere to a substrate upon contact with said substrate and upon application of heat at said heat transfer temperature.

3. A process for forming a unitary heat-transferable security stamp as claimed in claim 2 wherein said release layer, said base coat layer, said design layer, and said top coat layer are further formed by at least one drying step.

4. A process for forming a unitary heat-transferable security stamp as claimed in claim 3 wherein said drying step is characterized by microwave irradiation.

5. A process for forming a unitary heat-transferable security stamp as claimed in claim 3 wherein respective drying steps are executed following presentation of a selected one of said layers and prior to presentation of a subsequent one of said layers.

6. A process for forming a unitary heat-transferable security stamp as claimed in claim 2 wherein said release layer is applied to a major surface of said carrier sheet, said base coat layer is applied to said release layer, said design layer is applied to said base coat layer, and said top coat layer is applied to said design layer.

7. A process for forming a unitary heat-transferable security stamp as claimed in claim 2 wherein at least one of said water-borne components is presented as an aqueous emulsion.

8. A process for forming a unitary heat-transferable security stamp as claimed in claim 2 wherein at least one of said water-borne components is presented as an aqueous solution.

9. A process for forming a unitary heat-transferable security stamp as claimed in claim 2 wherein said adhesive release layer is formed by presenting a wax emulsion.

10. A process for forming a unitary heat-transferable security stamp as claimed in claim 2 wherein said adhesive release layer is formed by presenting a blend of polyethylene and an aqueous paraffin wax emulsion.

11. A process for forming a unitary heat-transferable security stamp as claimed in claim 2 wherein said adhesive release component is selected to have a melting point that is less than said heat transfer temperature.

12. A process for forming a unitary heat-transferable security stamp as claimed in claim 2 wherein said base coat layer is formed by presenting a polymeric emulsion including said base coat component.

13. A process for forming a unitary heat-transferable security stamp as claimed in claim 2 wherein said base coat component is presented so as to form a cross linked polymeric layer.

14. A process for forming a unitary heat-transferable security stamp as claimed in claim 2 wherein a melting point of said base coat component exceeds said heat transfer temperature.

15. A process for forming a unitary heat-transferable security stamp as claimed in claim 2 wherein said design layer is formed by presenting a polymeric emulsion including said design component.

16. A process for forming a unitary heat-transferable security stamp as claimed in claim 2 wherein said design layer is formed in a visually perceptible pattern in said security stamp.

17. A process for forming a unitary heat-transferable security stamp as claimed in claim 2 wherein said design layer is formed by presenting a design component including a pigment or dye.

18. A process for forming a unitary heat-transferable security stamp as claimed in claim 2 wherein a melting point of said design component exceeds said heat transfer temperature.

19. A process for forming a unitary heat-transferable security stamp as claimed in claim 2 wherein a plurality of design layers are provided, and wherein each design layer includes a distinct design component.

20. A process for forming a unitary heat-transferable serenity stamp as claimed in claim 2 wherein said top coat layer is formed by presenting a polymeric emulsion including said top coat component.

21. A process for forming a unitary heat-transferable security stamp as claimed in claim 2 wherein said top coat component is selected such that said heat transfer temperature is at least as great as a characteristic softening temperature of said top coat.

22. A process for forming a unitary heat-transferable security stamp as claimed in claim 2 wherein at least one of said release layer, said base coat layer, said design layer, and said top coat layer are formed to incorporate a security feature selected from the following group of security features and combinations thereof: fluorescent, thermochromic, and photo-chromic.

23. A process for forming a unitary heat-transferable security stamp as claimed in claim 2 wherein said top coat component is further selected such that it is not operative to adhere to said substrate upon application of heat below said heat transfer temperature.

24. A process for forming a unitary heat-transferable security stamp as claimed in claim 17 wherein said pigment or dye is selected such that it becomes apparent upon exposure to an activating agents selected from heat, a selected light intensity, or a selected UV light wavelength.

25. A process for forming a unitary heat-transferable security stamp as claimed in claim 2 further comprising the step of forming an additional design layer in a predetermined pattern on said top coat layer.

26. A process for forming a unitary heat-transferable security stamp as claimed in claim 25 wherein said additional design layer is formed after formation of the remaining layers of said stamp.

27. A process for forming a unitary heat-transferable security stamp as claimed in claim 25 wherein said additional design layer is formed of UV fluorescent ink.

28. A process for forming a unitary heat-transferable security stamp as claimed in claim 25 wherein said additional design layer is formed via an ink jet printing process.

29. A process for forming a unitary heat-transferable security stamp as claimed in claim 25 wherein said additional design layer comprises a number selected from a series of consecutive numbers.

30. A process for forming a unitary heat-transferable security stamp as claimed in claim 25 wherein said additional design layer comprises a security pattern or number printed in UV fluorescent ink.

31. A process for forming a unitary heat-transferable security stamp, said stop being defined in its entirely by a carrier sheet and a plurality of components, said components including a top coat layer, at least one design layer between said carrier sheet and said top coat layer, a release layer between said carrier sheet and said design layer, and a base coat layer between said release layer and said design layer, wherein said process comprises the steps of providing said carrier sheet; and forming said release layer, said base coat layer, said design layer, and said top coat layer, wherein said plurality of components defining the entirety of said stamp with said carrier sheet are presented as water-borne components, including a water-borne adhesive release component, a water-borne base coat component, a water-borne design component, and a water-borne top coat component such that said process for forming said unitary heat-transferable security stamp is entirely free of non-aqueous solvents, said carrier sheet comprises a non-siliconized densified paper liner and is selected such that it is resistant to heat above a predetermined heat transfer temperature, said adhesive release component of said release layer is selected such that it is operative to secure said carrier sheet to said base coat layer at temperatures below said heat transfer temperature and to permit release of said carrier sheet from said base coat layer at temperatures above said heat transfer temperature, said base coat component of said base coat layer comprises a water-borne modified acrylic material and is selected such that it is operative to function as a barrier between said release layer and said design layer at temperatures above and below said heat transfer temperature, said design component of said design layer comprises a film-forming acrylic polymer dissolved in a solution of water and is selected such that it is operative to provide an indication of the presence of said security stamp, and said top coat component comprises a blend of water-borne film-forming polymers including a tackifying resin and is selected such that it is operative to adhere to a substrate upon contact with said substrate and upon application of heat at said heat transfer temperature.

* * * * *

UNITED STATES PATENT AND TRADEMARK OFFICE
CERTIFICATE OF CORRECTION

PATENT NO. : 6,410,082 B1
DATED : June 25, 2002
INVENTOR(S) : Pinell et al.

It is certified that error appears in the above-identified patent and that said Letters Patent is hereby corrected as shown below:

Column 8,
Line 51, "said beat" should be -- said heat --;
Line 60, "to provide al indication" should be -- to provide an indication --;

Column 10,
Line 1, "heat-transferable serenity stamp" should be -- heat-transferable security stamp --;
Line 50, "said stop being" should be -- said stamp being --; and
Line 50, "defined in its entirely" should be -- defined in its entirety --

Signed and Sealed this

Twelfth Day of November, 2002

*Attest:*

JAMES E. ROGAN

*Attesting Officer*

*Director of the United States Patent and Trademark Office*

UNITED STATES PATENT AND TRADEMARK OFFICE
CERTIFICATE OF CORRECTION

PATENT NO. : 6,410,082 B1
DATED : June 25, 2002
INVENTOR(S) : Pinell et al.

It is certified that error appears in the above-identified patent and that said Letters Patent is hereby corrected as shown below:

Title page,
Item [54], Title, "PROCESS FOR THE FORMATION OF A HEAT-TRANSFERABLE SECURITY STAMP ENTIRELY FREE OF NON-AQUEOUS SOLVENTS" should be -- PROCESS FOR THE FORMATION OF A HEAT-TRANSFERABLE SECURITY STAMP --;

Column 8,
Line 51, "said beat" should be -- said heat --;
Line 60, "provide al indication" should be -- to provide an indication --;
Line 60, "to provide al indication" should be -- to provide an indication --;

Column 10,
Line 2, "heat-transferable serenity stamp" should be -- heat-transferable security stamp --;
Line 50, "said stop being" should be -- said stamp being --; and
Line 50, "defined in its entirely" should be -- defined in its entirety --

Signed and Sealed this

Twenty-fourth Day of August, 2004

JON W. DUDAS
*Director of the United States Patent and Trademark Office*